United States Patent [19]

Chen

[11] Patent Number: 5,194,577
[45] Date of Patent: Mar. 16, 1993

[54] COMPOSITION COMPRISING CRYSTALLIZABLE POLYAMIDE FROM TEREPHTHALIC ACID, ADIPIC ACID, ALIPHATIC DIAMINE AND M-XYLYLENE DIAMINE

[75] Inventor: Yu-Tsai Chen, Glen Ellyn, Ill.

[73] Assignee: Amoco Corporation, Chicago, Ill.

[21] Appl. No.: 805,456

[22] Filed: Dec. 10, 1991

[51] Int. Cl.$^5$ .............................................. C08G 69/26
[52] U.S. Cl. ..................... 528/338; 524/606; 528/183; 528/339; 528/340; 528/346; 528/347; 528/349
[58] Field of Search ............... 528/338, 339, 340, 346, 528/347, 349, 183; 524/606

[56] References Cited

U.S. PATENT DOCUMENTS

| | | | |
|---|---|---|---|
| 2,766,221 | 10/1956 | Lum et al. | 260/78 |
| 2,766,222 | 10/1956 | Lum et al. | 260/78 |
| 3,962,524 | 6/1976 | Miyamoto et al. | 428/435 |
| 3,968,071 | 7/1976 | Miyamoto et al. | 260/37 N |
| 4,018,746 | 4/1977 | Brinkmann et al. | 260/78 R |
| 4,603,166 | 7/1986 | Poppe et al. | 524/606 |
| 4,603,193 | 7/1986 | Richardson et al. | 528/342 |
| 4,617,342 | 10/1986 | Poppe et al. | 524/606 |
| 4,831,108 | 5/1989 | Richardson et al. | |
| 4,863,991 | 9/1989 | Poppe et al. | 524/606 |
| 4,937,276 | 6/1990 | Nielinger et al. | 524/136 |
| 5,028,462 | 7/1991 | Matlack et al. | 428/35.7 |

FOREIGN PATENT DOCUMENTS 0122688 9/1989 European Pat. Off. .

*Primary Examiner*—Harold D. Anderson
*Attorney, Agent, or Firm*—Robert G. Ladd; Stephen L. Hensley; Frank J. Sroka

[57] ABSTRACT

Crystallizable polyphthalamides with a useful combination of thermal and mechanical properties comprising recurring moieties of terephthalic acid, adipic acid, an aliphatic diamine of 4 to 20 carbon atoms and meta-xylylene diamine.

19 Claims, No Drawings

COMPOSITION COMPRISING CRYSTALLIZABLE POLYAMIDE FROM TEREPHTHALIC ACID, ADIPIC ACID, ALIPHATIC DIAMINE AND M-XYLYLENE DIAMINE

FIELD OF THE INVENTION

This invention relates to crystalline polyamides and, more particularly, to such polyamides having a desirable combination of thermal and mechanical properties and to filled compositions thereof having heat deflection temperatures of 250° C. or greater.

BACKGROUND OF THE INVENTION

Commonly assigned U.S. Pat. No. 4,603,166 discloses polyphthalamide compositions which, when filled with glass fibers and molded, have heat deflection temperatures at 264 psi, determined according to ASTM D-648, above about 245° C. Included are compositions comprising recurring terephthalamide and adipamide or terephthalamide, isophthalamide and adipamide units. As disclosed therein, such compositions, including particulate- and fiber-filled compositions, exhibit desirable thermal properties including heat deflection temperature, high tensile strength and flexural modulus and are useful in various applications including preparation of molded articles, fibers, and laminates.

Commonly assigned U.S. Pat. No. 4,617,342 and commonly assigned, U.S. Pat. No. 4,863,991, to Poppe et al., and published European Patent Application No. 84300745.1 (Publication No. 0122688), disclose polyphthalamides which, when filled with glass fibers, have heat deflection temperatures at 264 psi, determined according to ASTM D-648, above 240° C. Compositions according to U.S. Pat. No. 4,617,342 are prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Compositions taught in U.S. Pat. No. 4,863,991 are based on terephthalic acid and isophthalic acid compounds in a mole ratio of about 70:30 to about 99:1 and hexamethylene diamine. Such compositions have utility in various applications, the neat and fiber-filled compositions being particularly suited for molding applications.

For certain end uses it would be desirable to modify certain properties of polyphthalamides such as those described above. In particular, it would be desirable to provide polyphthalamides with improved properties such as lower moisture absorption and improved heat deflection temperatures. Reduced moisture absorption is important because it can lead to better retention of mechanical properties by articles fabricated from polyamides when exposed to wet or humid environments. Such improvements would lead not only to improved performance of products fabricated from such resins in existing end uses, but also utility in additional applications with more stringent requirements. Examples of specific applications for such polyphthalamides where the above improvements would be beneficial include many injection molding and engineering applications, such as electrical and electronic connections, pump housings, and automobile under-the-hood and trim parts, especially those under-the-hood parts which are exposed to higher than ambient temperatures.

In general, it is known that modification of polymer properties may be achieved in various ways. Modification of the molecular structure of a given composition through the use of additional monomers in polymerization can lead to desirable improvements in some properties. However, the same often are accompanied by loss of other desirable properties and use of additional monomers is not always practical due to process considerations. Addition of other materials to a polymeric composition may lead to property improvements without complicating a polymerization process; however, improvements in some properties often are achieved at the expense of other properties. Blending a given polymer with one or more other polymers may give blends with combinations of properties intermediate those of the individual components; however, processing requirements often limit the number of candidates that can be blended with a given polymer in an attempt to attain desirable property modifications and properties of a blend may or may not reflect those of its components depending on compatibility of the components with each other, reactivity thereof under blending or processing conditions and other factors.

Patents disclosing polymers containing meta-xylylene diamine are discussed below.

U.S. Pat. No. 2,766,221 discloses polyamides of meta-xylylene diamine and aliphatic dicarboxylic acids of 6 to 10 carbon atoms useful in the production of films, molded articles and the like.

U.S. Pat. No. 2,766,222 discloses polyamides of meta-xylylene diamine and isophthalic acid and mixtures of isophthalic acid and terephthalic acid.

U.S. Pat. No. 4,937,276 discloses polyamide molding compositions containing the polycondensation product of terephthalic acid, adipic acid and hexamethylenediamine reinforced with glass fibers and stabilized with a mixture of copper-, halogen- and phosphorus-containing compounds.

U.S. Pat. No. 4,018,746 discloses amorphous unfilled polyamides prepared by polycondensing meta-xylylene diamine preferably present at 50 to 85 percent of the total amine content, which may optionally be partially substituted by paraxylylene diamine, at least one straight chain aliphatic diamine, at least one unsubstituted aromatic dicarboxylic acid and at least one aliphatic saturated dicarboxylic acid.

U.S. Pat. No. 3,962,524 discloses a glass fiber reinforced polyamide resin composition comprising a polyamide resin obtained by the condensation reaction of xylylene diamine with an aliphatic straight-chain dicarboxylic acid having 6 to 12 carbon atoms and 5 to 50 weight percent of glass fibers.

U.S. Pat. No. 3,968,071 discloses a polyamide molding composition of 3 to 97 weight percent of a meta-xylylene diamine and adipic acid polyamide, 97 to 3 weight percent of nylon 6,6 and glass fibers.

Polyamide resins containing moieties of AA and MXDA are available from Mitsubishi Gas Company as RENY-6001, an unfilled polyamide having a molar ratio of AA:MXDA of 50:50 and RENY-1002, a nucleated and 30 wt % glass fiber-filled polyamide having a molar ratio of AA:MXDA of 50:50. These polymer resins have 100 mole percent of their aliphatic moieties provided by the dicarboxylic acid component of adipic acid and 100 mole percent of their aromatic moieties provided by the diamine component of meta-xylylene diamine. The HDT of these resins were measured at 264 psi according to ASTM D 648 and found to be 69° and 88° C. for the neat and filled resins, respectively.

Although the above patents disclose polyamides prepared from dicarboxylic acids and meta-xylene diamine, none discloses the invented crystalline polyamide compositions comprising recurring units based on terephthalic acid, adipic acid, hexamethylene diamine and meta-xylylene diamine wherein about 10 to about 30 mole percent of the aliphatic moieties are provided by the dicarboxylic acid components and about 10 to about 30 mole percent of the aromatic moieties of the polyamide compositions are provided by the diamine components, nor the desirable thermal and mechanical properties exhibited by such compositions. Surprisingly, polyamide compositions of the present invention filled with fibrous and particulate fillers have excellent heat deflection temperatures of greater than 250° C. when molded.

An object of this invention is to provide an improved polyamide composition. A further object is to provide a polyphthalamide composition having utility in injection molding and other applications. A still further object of the invention is to provide filled polyphthalamide compositions having improved heat deflection temperature and lower moisture absorption resulting in improved retention of mechanical properties when used in applications involving exposure to wet or humid environments.

The objects of this invention can be attained by providing a crystallizable resinous polymer comprising recurring units of dicarboxylic acid moieties derived from terephthalic and adipic acid and diamine moieties derived from meta-xylylene diamine and an aliphatic diamine having 4 to 20 carbon atoms and to fibrous and particulate filled compositions of the resinous polymers.

Generally, such polyphthalamides have melting points of about 280° to about 315° C. and a glass transition temperature ("Tg") of about 105° to about 125° C. The invented polyamides and polyamide composition provide good mechanical properties when used in applications involving exposure to wet or humid environments.

SUMMARY OF THE INVENTION

In brief, the polyamide of this invention is provided by a crystallizable resinous polymer comprising recurring aliphatic and aromatic moieties in units of:

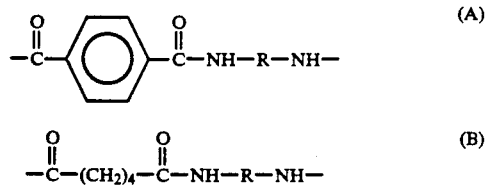

wherein each R comprises a meta-xylylene radical or a divalent aliphatic radical of 4 to 20 carbon atoms with the proviso that the mole ratio of meta-xylylene radicals:aliphatic radicals of 4 to 20 carbon atoms is about 10–30:90–70 and the molar ratio of the dicarboxylic acid moieties in the A:B units is about 90–70:10–30. This invention also includes compositions comprising the crystallizable resinous polymers described above with about 20 to about 50 wt % of a fibrous or particulate filler.

DESCRIPTION OF THE INVENTION

In more detail, the crystallizable resinous polymers of this invention comprise recurring dicarboxylic acid moieties of terephthalic acid ("TA"), adipic acid ("AA"), a divalent aliphatic diamine ("AD") of 4 to 20 carbon atoms and meta-xylylene diamine ("MXDA"). The molar ratio of the TA:AA:AD:MXDA units in the polymers of this invention is about 45–35:5–15:45–35:5–15 with such polyphthalamides generally have a melting point of about 280° to about 315° C. and a Tg of about 105° to about 125° C. The invented compositions exhibit high tensile strength, high stiffness and excellent thermal properties such as Tg and heat deflection temperature (HDT).

When reinforced with about 20 to about 50 wt % fibrous- or particulate-fillers, the HDT of the filled composition is about 250° C. or greater and in particular compositions filled with 30 wt % glass fibers have a HDT of greater than 280° C. In addition, the filled compositions exhibit other desirable properties such as improved tensile strength and flexural strength and improved dimensional stability, properties which have been found useful in molding precision parts.

Referring to the dicarboxylic acid moieties in more detail, the aromatic dicarboxylic acid moiety comprises terephthalic acid. Up to 10 mole percent of the terephthalic acid can be replaced with isophthalic acid ("IA"). Replacing more than 10 mole percent of the Ta with IA can lead to a slower crystallizing polyamide. The aliphatic dicarboxylic acid moiety comprises adipic acid.

For the aliphatic diamine moiety, R comprises at least one divalent straight chain or cyclic aliphatic radical of about 4 to about 20 carbon atoms having up to one methyl substituent per carbon atom because the invented compositions containing such radicals exhibit a desirable combination of melt processability and physical properties in articles prepared therefrom. Examples of such preferred radicals include tetramethylene, 2- and 3-methyl pentamethylene, hexamethylene, 2- and 3-methyl hexamethylene, 2,5-dimethyl hexamethylene, octamethylene, 1,2-, 1,3- and 1,4-cyclohexane, 3,3'-, 3,4'- and 4,4'-dicyclohexylmethane, dodecamethylene and combinations thereof. More preferably, R comprises octamethylene or hexamethylene because fiber-filled polyphthalamide compositions according to the invention containing such R groups typically exhibit heat deflection temperatures at 264 psi of at least about 250° C. Best results are achieved when R is hexamethylene.

The aromatic diamine moiety comprises meta-xylylene diamine. Part of the MXDA radical can be replaced by one or more other types of divalent aromatic radicals, e.g., phenylene, para-xylylene, oxybisphenylene or methylenebisphenylene. The proportion of such other divalent aromatic radicals should not exceed 20 to 30 percent of the total moles of MXDA present as greater proportions can lead to sacrifices in melt processibility, crystallinity and other properties.

For the polyphthalamide compositions of this invention comprising recurring units derived from dicarboxylic acids of terephthalic acid and adipic acid and diamines of meta-xylylene diamine and an aliphatic diamine comprising at least one divalent straight chain or cyclic aliphatic radical of about 4 to about 20 carbon atoms having up to one methyl substituent per carbon atom, preferably hexamethylene diamine, it has been unexpectedly found that compositions comprising about 10 to about 30 mole percent of aliphatic moieties, representing about 5 to about 15 percent of the total moles making up the polymer, derived from the dicarboxylic acid component and about 10 to about 30 mole percent of aromatic moieties, representing about 5 to about 15 percent of the total moles making up the polymer, derived from the diamine component have desirable thermal and mechanical properties and that these compositions when molded with about 20 to about 50 wt % of fibrous and particulate fillers exhibit heat deflection temperatures @ 264 psi as measured according to ASTM D-648 of at least 250° C. The molar ratio of the aliphatic moieties to the aromatic moieties within the molar ratio for TA:AA:HMDA:MXDA of 45-35-:5-15:45-35:5-15 can range from about 0.67:1.5. Preferably, for facile preparation of the compositions and excellent combination of physical properties the molar ratio of aliphatic:aromatic moieties is about 0.8:1.2.

If desired, the invented compositions also can comprise a fibrous or particulate filler component. Fibrous fillers can impart improved mechanical properties such as tensile strength and flexural modulus. Particulate fillers can also be used to obtain improvements in these properties as well as compositions of increased density and lower cost. Combinations of such materials also can be used. Typically, amounts of such fibers or particulates can range up to about 60 wt % based on weight of the filled composition. Preferably, about 20 to about 50 wt % of fibers or particulates is used to achieve desirable mechanical properties without substantial adverse affects on melt processibility. Representative fibers suitable as reinforcing agents include glass fibers, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool and wood cellulose fibers, etc. Representative filler materials include calcium silicate, silica, clays, talc, mica, carbon black, titanium dioxide, wollastonite, polytetrafluoroethylene, graphite, alumina trihydrate, sodium aluminum carbonate, barium ferrite, etc.

Fiber-filled compositions according to this invention are particularly desirable because they combine the desirable polyphthalamide properties with improvements in tensile and flexural strength, modulus and heat deflection temperature imparted by the fibers, making such polyphthalamide compositions particularly well suited as injection molding materials. Glass fibers are especially preferred for molding applications. Specific examples of glass fibers include alkali-free, boron-silicate glass or alkali-containing C-glass. Suitably, average thickness of the fibers is between about 3 and 30 microns. It is contemplated to use long fibers e.g., ranging from about 5 mm to about 50 mm, and also short fibers, e.g., from about 0.05 mm to about 5 mm. In principle, any standard commercial grade fiber, especially glass fibers, can be used.

Preferred glass fibers for injection molding applications have lengths of about 0.25 mm to about 25 mm. While longer or shorter fibers are suitable, the former can be difficult to disperse in the polyphthalamide, thereby lessening their reinforcing effect. Shorter fibers are easily dispersed but provide less reinforcement due to their low aspect ratio.

The fibers can be sized or unsized and may include a coupling agent to improve adhesion of the fibers to the polyphthalamide. Commercially available glass fibers supplied with sizing agent applied thereto can be used as such or with the size removed, for example by abrasion. Sizing agents resistant to degradation or release of volatiles at temperatures employed in processing the invented compositions are preferred; examples include polyesters and polyester-urethanes. Examples of coupling agents include various silane, titanate and chromium compounds as known to those skilled in the art.

A preferred polyphthalamide according to this invention comprises recurring units of TA, AA, AD, and MXDA, as represented above, in proportions such that the molar ratios of the TA:AA:AD:MXDA units is about 45-35:5-15:45-35:5-15. The preferred molar ratios result in polyphthalamide compositions with fast crystallization rates, thereby resulting in fast and economical molding cycles, high crystallinity, high glass transition temperatures and good chemical resistance. In particular, the invented compositions comprising a polyphthalamide component, wherein TA, AA, AD, and MXDA are present in such proportions and AD is hexamethylene diamine, and 20 to 50 wt % glass fibers are particularly advantageous because they exhibit heat deflection temperatures at 264 psi according to ASTM D-648 of at least about 250° C. Particularly preferred compositions according to the invention are those wherein the molar ratio of TA:AA:AD:MXDA is about 45-35:5-15:45-37.5:5-12.5 wherein filled compositions thereof have a HDT of 280° C. or greater.

Compositions according to this invention also can contain pigments, stabilizers, flame retardants, nucleating agents, lubricants, impact modifiers and other suitable additives to improve or modify properties. Conventional additives include lubricants such as stearyl alcohol, metallic stearates and ethylene bisstearamide and heat stabilizers such as alkali metal halides and combinations thereof with copper salts and phosphorous acid, sodium or alkyl or aryl phosphates, and phosphites, various cupric salts of organic or inorganic acids, such as cupric acetate and butyrate, and alkali or alkaline earth metal halides, such as sodium iodide and potassium iodide.

The invented compositions also can be alloyed or blended with other thermoplastic resins, for example, other polyamides, polyesters, poly(aryl ether sulfones), polyarylene sulfides or oxides, polyamide-imides, polyetherimides, polyarylates, polycarbonates or combinations thereof to provide compositions with beneficial properties.

The invented polyphthalamides can be prepared from the appropriate starting materials, e.g., a dicarboxylic acid component comprising terephthalic acid and adipic acid, or their derivatives, and a diamine component comprising meta-xylylene diamine and a divalent straight-chain or cyclic aliphatic diamine of about 4 to about 20 carbon atoms having up to one methyl substituent per carbon atom, preferably hexamethylene or octamethylene diamine and derivatives thereof, in suitable proportions by any suitable means. The dicarboxylic acid component and diamine component are used in essentially stoichiometric quantities although a slight excess of either, e.g., up to about 10 mole percent, can be used to account for loss of reactants or to provide final products with a predominance of acid or amine end groups as desired. One suitable preparation involves a salt preparation step, preferably conducted batchwise to achieve proper stoichiometry, wherein dicarboxylic acid and diamine components and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or continuously. In the condensation section substantial conversion of salts to polymer takes place. The condensation product then typically is introduced into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like. Commonly assigned U.S. Pat. Nos. 4,603,193 and 4,831,108 issued to Richardson et al. and incorporated herein by reference, also disclose suitable methods for preparation of such polyphthalamides by a process particularly suited for high melting polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at low residence time and passing the resulting product to a finishing reactor to increase conversion thereof.

Filled compositions according to this invention can be prepared by combining components comprising the invented polyphthalamide and a fibrous or particulate filler component by any suitable means. Conveniently, the invented polyphthalamide in powder, pellet or another suitable form is melt compounded together with the filler component and any other additives or materials to be used in desired amounts, at a temperature effective to render the polyphthalamide molten without degradation thereof, in a high-shear mixer, e.g., a twin-screw extruder, to obtain substantially uniform dispersion of filler component and any other additives in the polyphthalamide. Use of kneading blocks or other suitable mixing elements in the compounding operation aids in achieving a high degree of dispersion of the components. To minimize degradation of the polyphthalamide, preferred temperatures when using a twin-screw mixer are equal to or up to about 20° C. greater than the melting point of the component. Mixing of the components in solid form prior to melt compounding can be conducted to facilitate melt blending. Fibers or particulates also can be incorporated by feeding the same to the molten polyphthalamide in an extruder or other compounding apparatus or by other suitable methods.

The invented compositions are particularly useful as injection molding compounds for production of molded objects, for example, chemical and refinery equipment components, computer parts, electronic connectors, switch components, pump housings, pulleys, valve components and automobile trim and under-the-hood parts.

The present invention is further illustrated by the following examples which are not, however, to be construed as limitations thereof.

EXAMPLES 1-2

A polyphthalamide was prepared from terephthalic acid, adipic acid, hexamethylene diamine ("HMDA"), and meta-xylylene diamine in mole ratios of about 37.5:12.5:37.5:12.5 having a molar ratio of aliphatic-:aromatic moieties of 1:1 as described below. To a large, stainless steel, stirred reactor having an oil jacket heating system, the reactants were added in the following quantities: 373.8 grams terephthalic acid, 109.6 grams adipic acid, 102.2 grams meta-xylylene diamine, 375.1 grams HMDA solution containing 27.5 weight percent water, 50 grams deionized water, and 0.7 grams sodium hypophosphite. The temperature controller was set at a temperature of 317° C. The agitator was set at 10 rpm. After about 33 minutes, the pressure in the reactor rose to about 120 psi and was held at this pressure for about 26 minutes as the temperature rose to 297° C. The pressure was vented to atmospheric pressure over a period of 8 minutes and a nitrogen sweep was applied. During this time the temperature of the reactor contents rose to about 308° C. The current drawn by the agitator motor increased from 1.78 to 1.89 amps and the polymer in the reactor was taken out and placed into water to stop the reaction for a total run time of 67 minutes. The cooled polymer was removed from the water and ground to about 3 mm in size and dried in a pumped vacuum oven at 110° C. and 0.05 mm Hg for 24 hours. The inherent viscosity (IV), determined at 30° C. on a 0.4 weight percent solution of the polymer, in a solvent of 60/40 w/w phenol/1,1,2,2-tetrachloroethane, was 1.92 dl/g. Filled compositions were prepared by physically mixing the dried polyphthalamide with commercially available 0.32 cm long glass fibers identified as PPG 3540 from PPG Industries, Inc., in amounts sufficient to yield filled compositions containing 30 weight percent glass fibers based on weight of the filled compositions. Physical mixing was accomplished using a bucket tumbler. The unfilled and filled compositions (Examples 1 and 2, respectively) were then injection molded into test bars using an Arburg Injection Molding Machine operated as reported below as follows:

| | |
|---|---|
| Injection Pressure: | 21–42 kg/cm$^2$ |
| Holding Pressure: | 18–28 kg/cm$^2$ |
| Back Pressure: | 3.5–7 kg/cm$^2$ |
| Screw Speed: | 160–180 rpm |
| Injection Speed Setting: | 5 |
| Injection Time Setting: | 10 seconds forward, 20 seconds hold |
| Total Cycle Time: | 44 seconds |

Physical properties of the test bars were determined according to the following methods:

| | |
|---|---|
| Tensile Properties: (including Ultimate Tensile Strength ("UTS") and Elongation at Break): | ASTM D-638 (Type 1 test bars tested at 5 cm/minute) |
| Flexural Properties: | ASTM D-790 |
| Notched Izod Impact Strength: | ASTM D-256 |
| Tensile Impact Strength: | ASTM D-1822 (type S test bars were tested) |
| Heat Deflection Temperature: ("HDT") | ASTM D-648 |
| Glass Transition Temperature (Tg), Melting Temperature (Tm) and Melt Crystallization Temperature (Tc): | Pellets tested by Differential Scanning Calorimetry at 20° C./minute |

Test results are reported in Table 1.

EXAMPLES 3 AND 4

Following essentially the procedure of Examples 1 and 2, samples of a 35:15:37.5:12.5 molar ratio TA:AA:HMDA:MXDA polyphthalamide composition having a molar ratio of aliphatic:aromatic moieties of 1.1 were prepared and glass fiber-filled compositions were prepared therefrom. Each of these samples was molded at 135° C. The results are reported in Table 1. Inherent viscosities of these polyphthalamides were about 1.90 dl/g.

EXAMPLES 5 AND 6

Following essentially the procedure of Examples 1 and 2, samples of a 40:10:37.5:12.5 molar ratio TA:AA:HMDA:MXDA polyphthalamide composition having a molar ratio of aliphatic:aromatic moieties of 0.9 were prepared and glass fiber-filled compositions were prepared therefrom. Each of these samples was molded at 135° C. The results are reported in Table 1. Inherent viscosities of these polyphthalamides were about 1.95 dl/g.

EXAMPLES 7 AND 8

Following essentially the procedure of Examples 1 and 2, samples of a 35:15:35:15 molar ratio TA:AA:HMDA:MXDA polyphthalamide composition having a molar ratio of aliphatic:aromatic moieties of 1.0 were prepared and glass fiber-filled compositions were prepared therefrom. Each of these samples was molded at 135° C. The results are reported in Table 1. Inherent viscosities of these polyphthalamides were about 1.80 dl/g.

prepared following essentially the procedure of Examples 1 and 2. Comparative Example C had a mole ratio for TA:AA:HMDA:MXDA of 30:20:0:50 and a molar ratio of aliphatic:aromatic moieties of 0.25. Comparative Example D had 30 wt % of glass fiber added to the composition of Comparative Example C. Comparative Example E had a mole ratio for TA:AA:HMDA:MXDA of 30:20:20:30 and a molar ratio of aliphatic:aromatic moieties of 0.67 and Comparative Example F was a 30 wt % glass fiber-filled material of this composition. Physical properties for Comparative Examples A to F are reported in Table 2.

TABLE 2

|  | Comparative Example | | | | | |
|---|---|---|---|---|---|---|
|  | A | B | C | D | E | F |
| TA (mole %) | 0 | 0 | 30 | 30 | 30 | 30 |
| AA (mole %) | 50 | 50 | 20 | 20 | 20 | 20 |
| HMDA (mole %) | 0 | 0 | 0 | 0 | 30 | 30 |
| MXDA (mole %) | 50 | 50 | 50 | 50 | 20 | 20 |
| Glass (wt. %) | 0 | 30 | 0 | 30 | 0 | 30 |
| UTS (kpsi) | 11.3 | 23.9 | 15.9 | 25.1 | 16.6 | 25.1 |
| Elongation at Break (%) | 3.0 | 1.5 | 4.7 | 3.7 | 6.5 | 3.6 |
| Flexural Strength (kpsi) | 24.2 | 38.5 | 27.6 | 38.2 | 25.1 | 42.2 |
| Flexural Modulus (kpsi) | 590 | 1500 | 629 | 1590 | 485 | 1570 |
| Notched Izod (ft-lb/in) | 0.5 | 1.5 | 0.8 | 2.6 | 1.1 | 2.4 |
| HDT @ 264 psi (°C.) | 69 | 88 | 126 | 137 | 110 | 116 |
| HDT @ 66 psi (°C.) | 87 | NM | 135 | NM | 117 | NM |
| Mold Temp (°C.) | 93 | 93 | 93 | 93 | 93 | 93 |
| Barrel Temp (°C.) | | | | | | |
| Rear | 232 | 238 | 282 | 288 | 277 | 282 |
| Front | 243 | 246 | 307 | 304 | 293 | 299 |

TABLE 1

|  | Example | | | | | | | |
|---|---|---|---|---|---|---|---|---|
|  | 1 | 2 | 3 | 4 | 5 | 6 | 7 | 8 |
| TA (mole %) | 37.5 | 37.5 | 35 | 35 | 40 | 40 | 35 | 35 |
| AA (mole %) | 12.5 | 12.5 | 15 | 15 | 10 | 10 | 15 | 15 |
| HMDA (mole %) | 37.5 | 37.5 | 37.5 | 37.5 | 37.5 | 37.5 | 35 | 35 |
| MXDA (mole %) | 12.5 | 12.5 | 12.5 | 12.5 | 12.5 | 12.5 | 15 | 15 |
| Glass (wt. %) | 0 | 30 | 0 | 30 | 0 | 30 | 0 | 30 |
| UTS (kpsi) | 15.3 | 26.9 | 21.3 | 22.3 | 14.5 | 22.5 | 11.4 | 24.2 |
| Elongation at Break (%) | 5.4 | 2.6 | 5.2 | 2.9 | 4.8 | 2.7 | 3.7 | 2.9 |
| Flexural Strength (kpsi) | NM | 38.9 | NM | 32.3 | NM | 36.1 | 18.7 | 39.0 |
| Flexural Modulus (kpsi) | 544 | 1282 | 518 | 1306 | 601 | 1347 | 500 | 1550 |
| Notched Izod (ft-lb/in) | 1.2 | 2.3 | 1.4 | 2.3 | 1.3 | 2.1 | 0.5 | 2.0 |
| HDT @ 264 psi (°C.) | 119 | 281 | 118 | 286 | 128 | 306 | 112 | 253 |
| HDT @ 66 psi (°C.) | 133 | NM | 142 | NM | 139 | NM | 138 | NM |
| Mold Temp (°C.) | 135 | 135 | 135 | 135 | 135 | 135 | 135 | 135 |
| Barrel Temp (°C.) | | | | | | | | |
| Rear | 321 | 321 | 321 | 321 | 321 | 321 | 321 | 304 |
| Front | 327 | 327 | 327 | 327 | 327 | 327 | 327 | 316 |
| Nozzle | 327 | 327 | 327 | 327 | 327 | 327 | 327 | 316 |
| Tg (°C.) | 117 | NM | 111 | NM | 122 | NM | 108 | NM |
| Tc (°C.) | 259 | NM | 249 | NM | 271 | NM | 245 | NM |
| Tm (°C.) | 301 | NM | 292 | NM | 312 | NM | 283 | NM |
| Hf (cal/g) | 12.1 | NM | 12.5 | NM | 12.9 | NM | 10.3 | NM |

NM — Not measured

COMPARATIVE EXAMPLES

For purposes of comparison a commercial sample of RENY-6001 (Comparative Example A), a neat polyamide resin of AA and MXDA, and RENY-1002 (Comparative Example B) a 30 wt % glass fiber-filled polyamide resin of AA and MXDA, were measured for physical properties. Additionally, compositions were TABLE 2-continued

|  | Comparative Example | | | | | |
|---|---|---|---|---|---|---|
|  | A | B | C | D | E | F |
| Nozzle | 243 | 246 | 302 | 304 | 293 | 299 |
| Tg (°C.) | 83 | NM | 139 | NM | 118 | NM |
| Tc (°C.) | 190 | NM | NM | NM | NM | NM |
| Tm (°C.) | 236 | NM | 276 | NM | NM | NM |
| Hf (cal/g) | 12.2 | NM | NM | NM | NM | NM |

NM - Not measured

I claim:

1. A crystallizable resinous polymer comprising recurring aliphatic and aromatic moieties of:

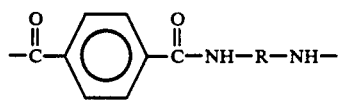 (A)

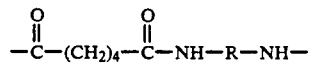 (B)

wherein R comprises diamine radicals derived from meta-xylylene diamine and an aliphatic diamine having 4 to 20 carbon atoms with the proviso that the mole ratio of meta-xylylene radicals:aliphatic radicals of 4 to 20 carbon atoms is 10–30:90–70 and the molar ratio of terephthalic acid:adipic acid moieties in the A:B moieties is 90–70:10–30.

2. The resinous polymer of claim 1 wherein R comprises hexamethylene or octamethylene.

3. The resinous polymer of claim 1 wherein the aliphatic moieties comprise adipic acid and hexamethylene diamine and the aromatic moieties comprise terephthalic acid and meta-xylylene diamine.

4. The resinous polymer of claim 3 wherein the molar ratio of terephthalic acid:adipic acid:hexamethylene diamine:meta-xylylene diamine is about 45–35:5–15:-45–35:5–15.

5. The resinous polymer of claim 4 wherein the molar ratio of terephthalic acid:adipic acid:hexamethylene diamine:meta-xylylene diamine is about 45–35:5–15:-45–37.5:5–12.5.

6. The resinous polymer of claim 4 wherein the molar ratio of aliphatic:aromatic moieties is about 0.67:1.5.

7. The resinous polymer of claim 6 wherein the molar ratio of aliphatic:aromatic moieties is about 0.8:1.2.

8. A filled composition comprising the resinous polymer of claim 1 and a fibrous or particulate filler component.

9. The filled composition of claim 8 wherein R comprises hexamethylene or octamethylene.

10. The filled composition of claim 8 wherein the fibrous component comprises glass fibers.

11. The filled composition of claim 10 wherein the glass fibers comprise about 20 to about 50 weight percent of the filled composition.

12. A molded object comprising the resinous polymer of claim 1.

13. A molded object comprising the filled composition of claim 11.

14. A filled resinous polymer composition comprising recurring aliphatic and aromatic moieties of:

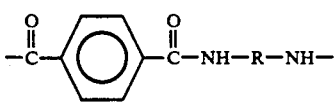 (A)

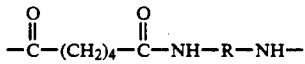 (B)

wherein R comprises diamine radicals derived from meta-xylylene diamine and an aliphatic diamine having 4 to 20 carbon atoms with the proviso that the mole ratio of meta-xylylene radicals:aliphatic radicals of 4 to 20 carbon atoms is 10–30:90–70 and the molar ratio of terephthalic acid:adipic acid moieties in the A:B moieties is 90–70:10–30.

15. The filled composition of device 14 comprising about 20 to about 50 weight percent glass fibers.

16. The filled composition of claim 14 wherein the aliphatic moieties comprise adipic acid and hexamethylene diamine and the aromatic moieties comprise terephthalic acid and meta-xylylene diamine.

17. The filled composition of claim 16 wherein the molar ratio of terephthalic acid:adipic acid:hexamethylene diamine:meta-xylylene diamine is about 45–35-:5–15:45–35:5–15.

18. The filled composition of claim 17 wherein the molar ratio of terephthalic acid:adipic acid:hexamethylene diamine:meta-xylylene diamine is about 45–35-:5–15:45–37.5:5–12.5.

19. The filled composition of claim 18 having a heat deflection temperature of 280° C. or greater as measured according to ASTM D-638 at 264 psi.

* * * * *